No. 721,617. PATENTED FEB. 24, 1903.
G. J. SNELUS.
METHOD OF PURIFYING BLAST FURNACE GASES.
APPLICATION FILED SEPT. 29, 1902.
NO MODEL.

UNITED STATES PATENT OFFICE.

GEORGE JAMES SNELUS, OF FRIZINGTON, ENGLAND.

METHOD OF PURIFYING BLAST-FURNACE GASES.

SPECIFICATION forming part of Letters Patent No. 721,617, dated February 24, 1903.

Application filed September 29, 1902. Serial No. 125,264. (No specimens.)

*To all whom it may concern:*

Be it known that I, GEORGE JAMES SNELUS, Fellow of the Royal Society, a subject of the King of Great Britain, residing at Ennerdale Hall, Frizington, in the county of Cumberland, England, have invented a certain new and useful Improved Method of Purifying and Enriching Blast-Furnace Gases, of which the following is a specification.

This invention relates to methods for treating blast-furnace gas.

It is well known that blast-furnace gases mainly consist of a mixture of nitrogen, carbonic oxid, carbonic acid, and hydrogen, with some water-vapor. The proportions of these constituents vary somewhat, according to the fuel and ores used; but the following figures may be taken to indicate the general proportions by volume: nitrogen, fifty to sixty-six per cent.; carbonic oxid, twenty-four to thirty-two per cent.; carbonic acid, six to nine per cent.; hydrogen, 1.5 to 3.5 per cent. The mixed gas as it emerges from the furnace also carries with it a large quantity of dust or fume. This dust or fume is very objectionable and must be removed before the gas is suitable for internal-combustion engines. Hitherto the dust has been removed either by costly condensing apparatus or by fans. According to my present invention the said dust or fume is removed by forming it into a slag by the addition of a suitable flux which varies according to the nature of the dust, the aim being to form an easily-fusible slag—such as a trisilicate of lime, alumina, and soda—in a modified form of cupola or small blast-furnace.

In order that my invention may be clearly understood and readily carried into effect, I will now proceed to describe the same with reference to the accompanying drawings, in which—

Figure 1:
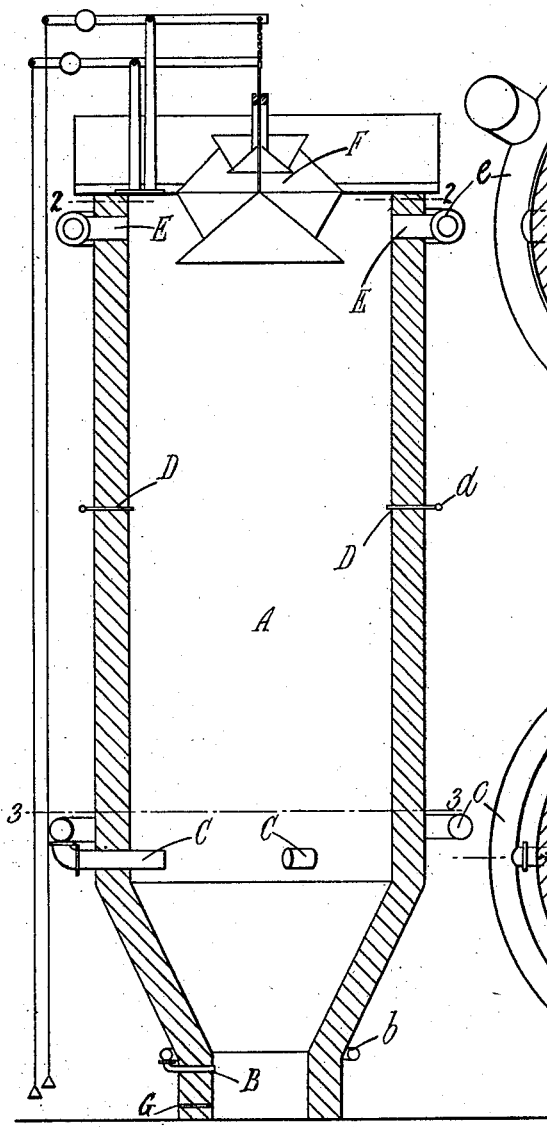
Figure 2:
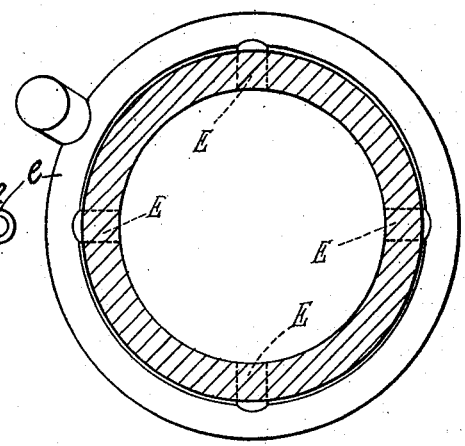
Figure 3:
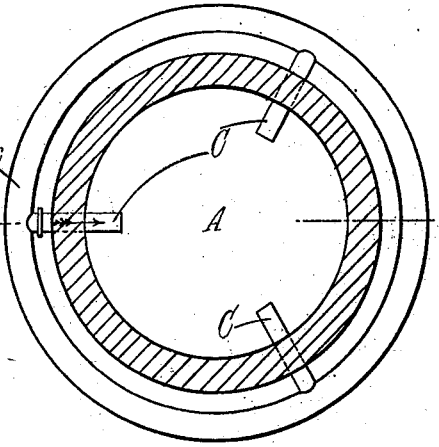

Figure 1 is a vertical section of an apparatus that I employ for carrying out the process of my invention. Fig. 2 is a transverse section taken approximately on the line 2 2 of Fig. 1, and Fig. 3 is a transverse section taken approximately on the line 3 3 of Fig. 1.

A is the combustion-chamber of the furnace.

B B are the blast-twyers.

C C are the twyers through which the blast-furnace gas is introduced.

D D are the steam-inlet pipes, and E E the gas-outlet pipes.

F is the device for closing the mouth of the furnace, and G is a slag-hole for the escape of the slag.

The twyers B B are connected together by means of a common annular pipe $b$, and the twyers C C, steam-pipes D D, and outlet-pipes E E are similarly connected by means of pipes $c$, $d$, and $e$, respectively.

Of the gaseous constituents of the gas carbonic oxid and hydrogen only are useful, the nitrogen and carbonic acid being inert and merely diluting the gas; but, as is well known, one volume of carbonic acid becomes two volumes of carbonic oxid by bringing it into contact with red-hot carbon.

In carrying out my invention I prefer to use the modified cupola or small blast-furnace, as shown in the drawings, and I charge the same with coke, anthracite, or other suitable fuel, with or without a mixture of small bituminous coal. When bituminous coal is used, the volatile products increase the calorific value of the gas and also its illuminating power. I charge with the fuel a suitable flux or fluxes—such as ground brick, powdered aluminous clay, soda-ash, or the like—so as to form with the dust in the blast-furnace gas a highly-fusible slag, such as a trisilicate of alumina, lime and soda, or the like. By this means the dust is melted and runs out at the bottom of the cupola through the hole G as slag. I blow hot or cold air through the twyers B B in the usual way. This develops great heat and produces a mixture of carbonic oxid and nitrogen. Above the blast-twyers B B, I place other and larger twyers C C, through which I force crude blast-furnace gas by a fan or other suitable means. As this gas passes through the incandescent fuel its carbonic acid takes up carbon and becomes carbonic oxid. There still remains in the descending fuel a considerable amount of heat, to utilize which I inject steam through the steam-inlet pipe D D at a higher level above the gas-twyers C C. This steam is decomposed by the hot fuel and forms carbonic oxid and hydrogen, thus still further enriching the ascending gases. I close the furnace by a double cup and cone F of usual construction in order, as far as posible, to prevent the escape of gas when charging, the purified and enriched gas being drawn off below the bottom cup at E in the usual way. Such gas will be of a much higher calorific value than crude blast-furnace gas and will be freed from the bulk of the dust which it originally contained.

I claim—

1. A method of treating blast-furnace gas, consisting in passing said gas through a mixture of hot fuel, small bituminous coal and a suitable flux, extracting the dust from said gas by forming with said dust and flux a fusible slag, enriching said furnace-gas by the admixture therewith of the gaseous products from said bituminous coal, and converting the carbon dioxid contained in said furnace-gas into carbon monoxid by the combustion of said carbonaceous fuel, substantially as described.

2. A method of treating blast-furnace gas consisting in passing said gas through incandescent fuel, injecting air-blast into the fuel at a point below the point of entry of said gas, extracting the dust from said gas by forming with said dust and flux a fusible slag, enriching said furnace-gas by the admixture therewith of the gaseous products from said bituminous coal, converting the carbon dioxid of the furnace-gas into carbon monoxid by the combustion of said carbonaceous fuel, and adding carbon monoxid and hydrogen to said furnace-gas by injecting steam into the hot fuel at a point some distance above the point that the crude blast-furnace gas enters into the incandescent fuel, so as to economize the otherwise waste heat in the descending fuel substantially as described.

In testimony whereof I have hereunto set my hand, in presence of two subscribing witnesses, this 18th day of September, 1902.

GEORGE JAMES SNELUS.

Witnesses:
T. SELLY WARDLE,
WILL. HARRIS.